(12) United States Patent
Zhang (10) Patent No.: US 12,357,929 B2
(45) Date of Patent: Jul. 15, 2025

(54) MULTIFUNCTIONAL WATER TREATMENT FILTER VALVE

(71) Applicant: Zhengzhou Kangrun Fluid Equipment Co. LTD, Zhengzhou (CN)

(72) Inventor: Kefeng Zhang, Zhengzhou (CN)

(73) Assignee: Zhengzhou Kangrun Fluid Equipment Co. LTD, Zhengzhou (CN)

( * ) Notice: Subject to any disclaimer, the term of this patent is extended or adjusted under 35 U.S.C. 154(b) by 531 days.

(21) Appl. No.: 17/965,804

(22) Filed: Oct. 14, 2022

(65) Prior Publication Data
US 2023/0311032 A1    Oct. 5, 2023

(30) Foreign Application Priority Data
Mar. 14, 2022    (CN) .......................... 202210249502.2

(51) Int. Cl.
| | | |
|---|---|---|
| *B01D 35/02* | (2006.01) | |
| *B01D 29/66* | (2006.01) | |
| *B01D 35/157* | (2006.01) | |
| *F16K 11/074* | (2006.01) | |
| *B01D 29/11* | (2006.01) | |
| *B01D 29/68* | (2006.01) | |
| *F16K 27/04* | (2006.01) | |

(52) U.S. Cl.
CPC ....... *B01D 35/1573* (2013.01); *B01D 29/668* (2013.01); *B01D 35/02* (2013.01); *F16K 11/074* (2013.01); *B01D 29/114* (2013.01); *B01D 29/68* (2013.01); *B01D 2201/165* (2013.01); *F16K 27/045* (2013.01)

(58) Field of Classification Search
CPC ...... B01D 35/02; B01D 29/668; B01D 29/68; F16K 27/045
See application file for complete search history.

(56) References Cited

U.S. PATENT DOCUMENTS

| | | | | |
|---|---|---|---|---|
| 5,328,609 | A * | 7/1994 | Magnusson ............. | C02F 1/003 210/295 |
| 6,012,476 | A * | 1/2000 | Ko ..................... | G05D 23/1313 137/98 |
| 7,549,446 | B2 * | 6/2009 | Yang ................... | F16K 11/0743 137/625.46 |
| 10,359,122 | B2 * | 7/2019 | Wu ........................... | C02F 1/42 |
| 2003/0034285 | A1 | 2/2003 | Hembree | |
| 2014/0209521 | A1 | 7/2014 | Harris | |
| 2016/0289881 | A1 * | 10/2016 | Song ....................... | D06F 25/00 |
| 2017/0089474 | A1 * | 3/2017 | Zhan ................... | F16K 11/0743 |
| 2021/0130198 | A1 | 5/2021 | Lee et al. | |

* cited by examiner

*Primary Examiner* — Craig M Schneider
*Assistant Examiner* — Christopher D Ballman
(74) *Attorney, Agent, or Firm* — Jose Cherson Weissbrot (57) ABSTRACT

The present disclosure belongs to the technical field of water treatment valve bodies, so as to solve the technical problem that an effective area of a water inlet and outlet hole inside a valve body cannot be simply and effectively reach an effective area of a water inlet and outlet pipe orifice outside the valve body. Based on this, a multifunctional water treatment filter valve is provided, including a valve body, a movable valve plate, a fixed valve plate, and a driving device. The fixed valve plate is fixedly mounted in the valve body; the movable valve plate and the fixed valve plate are in rotatable fit in the valve body; and a side wall of the valve body is provided with a water inlet, a water outlet, and a drainage opening.

5 Claims, 13 Drawing Sheets

MULTIFUNCTIONAL WATER TREATMENT FILTER VALVE

TECHNICAL FIELD

The present disclosure relates to the technical field of water treatment valve bodies, in particular, to a multifunctional water treatment filter valve.

BACKGROUND

In recent years, as more and more control valves with plane sealing structures are used in the field of water treatment, the market has approved the structures of plane valves. Existing industrial or civil water treatment systems mostly use a valve body of a control valve to switch flow channels. A control valve of a filter system needs to achieve functions of filtering, back flushing, forward flushing, etc. Non-filtering processes such as back flushing and forward flushing of the filter system are collectively referred to as a flushing process. An existing water treatment filter valve mainly changes a direction of water flow to achieve the functions of running, back flushing, forward flushing or simple running and back washing. Filter valves are generally used in industrial water treatment equipment such as carbon filtering and sand filtering, and are widely used in domestic water treatment equipment to remove impurities, residual chlorine, heavy metals, etc. to improve the quality of water used.

However, a valve body of a current filter valve usually has several fixed specifications in mounting dimensions. Under the same mounting dimensions, an effective area of a water inlet and outlet through hole inside the valve body is much smaller than an effective area of a water inlet and outlet pipeline outside the valve body. Due to the boundedness of the design, it is impossible to better and more effectively satisfy a filtered water flux.

SUMMARY

An embodiment of the present disclosure provides a multifunctional water treatment filter valve, which is used to solve the technical problem of the bottleneck in the prior art that an effective area of a water inlet and outlet hole inside a valve body is much smaller than an effective of a water inlet and outlet pipe orifice outside the valve body, and breaks through the design limitation. Under the same mounting dimension, the area of the water inlet and outlet hole inside the valve body can be randomly and freely designed until it exceeds the effective area of the water inlet and outlet pipe orifice outside the valve body.

An embodiment of the present disclosure provides a multifunctional water treatment filter valve, including a valve body, a movable valve plate, a fixed valve plate, and a driving device, wherein the fixed valve plate is fixedly mounted in the valve body; the movable valve plate and the fixed valve plate are in rotatable fit in the valve body; a side wall of the valve body is provided with a water inlet, a water outlet and a drainage opening; the driving device drives the movable valve plate and the fixed valve plate to cooperate with each other to achieve functions of running, back flushing and forward flushing; a first through hole, a second through hole, and a third through hole are formed in the fixed valve plate in sequence along a circumferential direction; the first through hole, the second through hole and the third through hole are all of arc fan-shaped structures and are arranged along the same central axis; a fourth through hole is formed in a center of the fixed valve plate; the second through hole includes a first water outlet through hole and a second water outlet through hole which are spaced from each other and are both arc fan-shaped; the first water outlet through hole and the second water outlet through hole are arranged along the same central axis; the first water outlet through hole is located at a position, close to the axis, on an inner side of the second water outlet through hole;

the valve body includes a first filter element interface, a second filter element interface, and a third filter element interface; the first filter element interface, the second filter element interface and the third filter element interface are respectively communicated with the first through hole, the second through hole and the third through hole; the drainage opening is L-shaped, a vertical section of which is arranged in a center position of the valve body and a horizontal section of which extends out of the side wall of the valve body; the fourth through hole sleeves a top of the drainage opening; the second filter element interface includes a spacing beam, and a first filter element water outlet interface and a second filter element water outlet interface which are spaced by the separation beam; positions of the first filter element water outlet interface and the second filter element water outlet interface respectively correspond to the first water outlet through hole and the second water outlet through hole and are respectively correspondingly communicated; a fourth filter element interface is arranged at a center position of a lower end of the valve body; the fourth filter element interface is communicated with the second filter element interface;

a limber hole communicated with the water inlet, and a first groove and a second groove are formed in the movable valve plate along the circumferential direction; the first groove and the second groove are both arc fan-shaped; a third groove is formed in a center position of the movable valve plate; the first groove includes a first blind slot, a second blind slot, and a third blind slot which are spaced from each other and are arranged along the same central axis; the first blind slot is arranged on an outer side of the second blind slot; the third blind slot is arranged on an inner side of the second blind slot; a first spacing beam is arranged between the first blind slot and the second blind slot; a second spacing beam is arranged between the second blind slot and the third blind slot; and the third blind slot is communicated with the third groove.

The working principle and process are as follows:

A running process of the multifunctional water treatment filter valve includes a normal running mode, a forward flushing mode and a back flushing mode. The driving device drives the movable valve plate to rotate to different positions to switch the filter valve among different running processes. A specific process is as follows:

In the normal running process, the limber hole is communicated with the first through hole; the second groove is communicated with the first water outlet through hole and the second water outlet through hole; and the third groove and the third through hole are correspondingly blocked. The working process is as follows: Water enters the valve body from the water inlet, and enters a tank body at a lower end of the valve body through the limber hole and the first through hole in sequence; and water flow then enters the second groove through the fourth filter element interface, the first filter element water outlet interface in the second filter element interface, and the first water outlet through hole, enters the second water outlet through hole through the second groove, and is discharged from the water outlet, thus achieving normal running of the filter valve.

In the back flushing mode, the limber hole is communicated with the first water outlet through hole; water to the second water outlet through hole is cut off; the first through hole is communicated with the third groove through the third blind slot; and the third groove is communicated with the drainage opening. The working process is as follows: Water enters the first water outlet through hole via the limber hole; the second water outlet through hole is blocked by the second blind plate on the movable valve plate; the water flow enters the tank body at the lower end of the valve body through the first filter element water outlet interface in the second filter element interface and the fourth filter element interface; the water flow backflows into a filter element layer via a center filter net of a filter element; the water arrives at the first filter element interface from the filter element layer; and wastewater generated by back flushing arrives at the first through hole through the first filter element interface, arrives at the fourth through hole through the third blind slot and the third groove, and is discharged from the drainage opening. During back flushing, the third through hole is covered by the second groove to cut off the water flow and form a sealed space.

In a forward flushing mode, the limber hole is communicated with the third through hole; the first water outlet thorough hole is communicated with the third groove through the third blind slot; the third groove is communicated with the drainage opening through the fourth through hole; and the second water outlet through hole is blocked by the first spacing beam on the movable valve plate. The working process is as follows: The water flow enters the valve body from the water inlet, and enters the filter layer of the filter element of the tank body at the lower end of the valve body through the limber hole and the third through hole in sequence; the water arrives at the fourth filter element interface and the second filter element interface from the center filter net, enters the third blind slot through the first water outlet through hole, and enters the third groove through the third blind slot; the water flow is finally discharged from the drainage opening connected to the fourth through hole, thus achieving the forward flushing process of the filter valve. During the forward flushing, the first through hole and the second groove are matched to form a closed space, and the second water outlet through hole and the first blind slot are matched to form a closed space to prevent the water from being discharged from the water outlet.

Further, the positions of the first filter element interface, the second filter element interface, and the third filter element interface respectively correspond to the positions of the first through hole, the second through hole, and the third through hole on a one-to-one basis.

In this way, it is beneficial to better achieve the rotatable fit between the fixed valve plate and the movable valve plate, and the functions are achieved more accurately and stably.

Further, each of the first through hole, the second through hole and the third through hole has a central angle of 120 degrees, and each of the limber hole, the first groove and the second groove has a central angle of 120 degrees.

In this way, the first through hole, the second through hole and the third through hole are arranged in a trisection manner to achieve a water inlet and outlet effective use area of the fixed valve plate, and the limber hole, the first groove and the second groove are also arranged in a trisection manner, so that cooperation between the movable valve plate and the fixed valve plate can be better achieved.

Further, a first blind plate is arranged on an inner side of the third through hole on the fixed valve plate; and the first blind plate separates the third through hole from the fourth through hole.

Further, the limber hole is perforated along an axial direction of the movable valve plate; the limber hole is of a ring fan-shaped structure; and an outer side of the limber hole along a radial direction of the movable valve plate is provided with a second blind plate.

The limber hole is perforated from top to bottom, so that the structure is simpler, and machining and production are easier.

In summary, the present disclosure has the following beneficial effects:

In the present disclosure, by means of the arrangement of the first water outlet through hole and the second water outlet through hole, due to the grooves of the movable valve plate, the effective area of the water inlet and outlet hole in the structure can exceed the effective area of the water inlet and outlet pipe orifice outside the valve body. Furthermore, the effective area of the water inlet and outlet hole inside valve body of the structure can be randomly designed, without being restrained by the mounting dimension. For products of the same type, due to the restriction of the mounting dimension, the effective area of the water inlet and outlet hole inside the valve body cannot be made to be larger. The effective area of the water inlet and outlet hole inside the valve body of the present disclosure can exceed the effective area of the water inlet and outlet pipe orifice outside the valve body. Furthermore, theoretically, this structure has reached the design limit of a single planar structural valve with the same functions without adding auxiliary equipment, and the structure is relatively simple, so that the use cost and the production cost are reduced, the efficiency is improved, and the performance is excellent.

In the drawings: 1: valve body; 11: water inlet; 12: water outlet; 13: drainage opening; 14: first filter element interface; 15: second filter element interface; 151: spacing beam; 152: first filter element water outlet interface; 153: second filter element water outlet interface; 16: third filter element interface; 17: fourth filter element interface; 2: movable valve plate; 21: limber hole; 22: first groove; 221: first blind slot; 222: second blind slot; 223: third blind slot; 23: second groove; 24: third groove; 25: second blind plate; 26: first spacing beam; 27: second spacing beam; 3: fixed valve plate; 31: first through hole; 32: second through hole; 321: first water outlet through hole; 322: second water outlet through hole; 33: third through hole; 34: fourth through hole; and 35: first blind plate.

DETAILED DESCRIPTION OF THE EMBODIMENTS

Embodiment 1

As shown in FIG. 1 to FIG. 13, a multifunctional water treatment filter valve includes a valve body 1, a movable valve plate 2, a fixed valve plate 3, and a driving device. The fixed valve plate 3 is fixedly mounted in the valve body 1. The movable valve plate 2 and the fixed valve plate 3 are in rotatable fit in the valve body 1. A side wall of the valve body 1 is provided with a water inlet 11, a water outlet 12 and a drainage opening 13. The driving device drives the movable valve plate 2 and the fixed valve plate 3 to cooperate with each other to achieve functions of running, back flushing and forward flushing. A first through hole 31, a second through hole 32, and a third through hole 33 are formed in the fixed valve plate 3 in sequence along a circumferential direction. The first through hole 31, the second through hole 32 and the third through hole 33 are all of arc fan-shaped structures and are arranged along the same central axis. A fourth through hole 34 is formed in a center of the fixed valve plate 3. The second through hole 32 includes a first water outlet through hole 321 and a second water outlet through hole 322 which are spaced from each other and are both arc fan-shaped. The first water outlet through hole 321 and the second water outlet through hole 322 are arranged along the same central axis. The first water outlet through hole 321 is located at a position, close to the axis, on an inner side of the second water outlet through hole 322.

The valve body 1 includes a first filter element interface 14, a second filter element interface 15, and a third filter element interface 16. The first filter element interface 14, the second filter element interface 15 and the third filter element interface 16 are respectively communicated with the first through hole 31, the second through hole 32 and the third through hole 33. The drainage opening 13 is L-shaped, a vertical section of which is arranged in a center position of the valve body 1 and a horizontal section of which extends out of the side wall of the valve body 1. The fourth through hole 34 sleeves a top of the drainage opening 13. The second filter element interface 15 includes a spacing beam 151, and a first filter element water outlet interface 152 and a second filter element water outlet interface 153 which are spaced by the separation beam 151. Positions of the first filter element water outlet interface 152 and the second filter element water outlet interface 153 respectively correspond to the first water outlet through hole 321 and the second water outlet through hole 322 and are respectively correspondingly communicated. A fourth filter element interface 17 is arranged at a center position of a lower end of the valve body 1. The fourth filter element interface 17 is communicated with the second filter element interface 152 on the second filter element interface 15.

Figure 7:
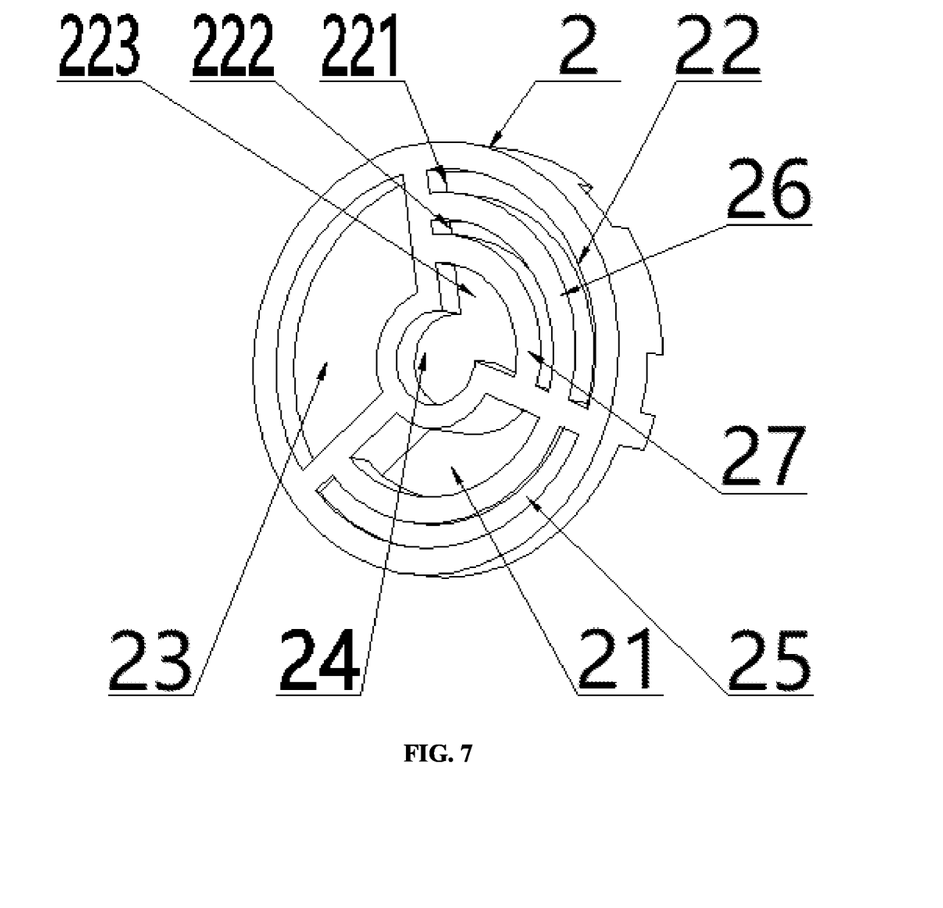
FIG. 7 is a schematic structural diagram of a movable valve plate in the present disclosure.

A limber hole 21 communicated with the water inlet 11, and a first groove 22 and a second groove 23 are formed in the movable valve plate 2 along the circumferential direction. The first groove 22 and the second groove 23 are both arc fan-shaped. A third groove 24 is formed in a center position of the movable valve plate 2. The first groove 22 includes a first blind slot 221, a second blind slot 222, and a third blind slot 223 which are spaced from each other and are arranged along the same central axis. The first blind slot 221 is arranged on an outer side of the second blind slot 222. The third blind slot 223 is arranged on an inner side of the second blind slot 222. A first spacing beam 26 is arranged between the first blind slot 221 and the second blind slot 222. A second spacing beam 27 is arranged between the second blind slot 222 and the third blind slot 223. The third blind slot 223 is communicated with the third groove 24.

Figure 8:
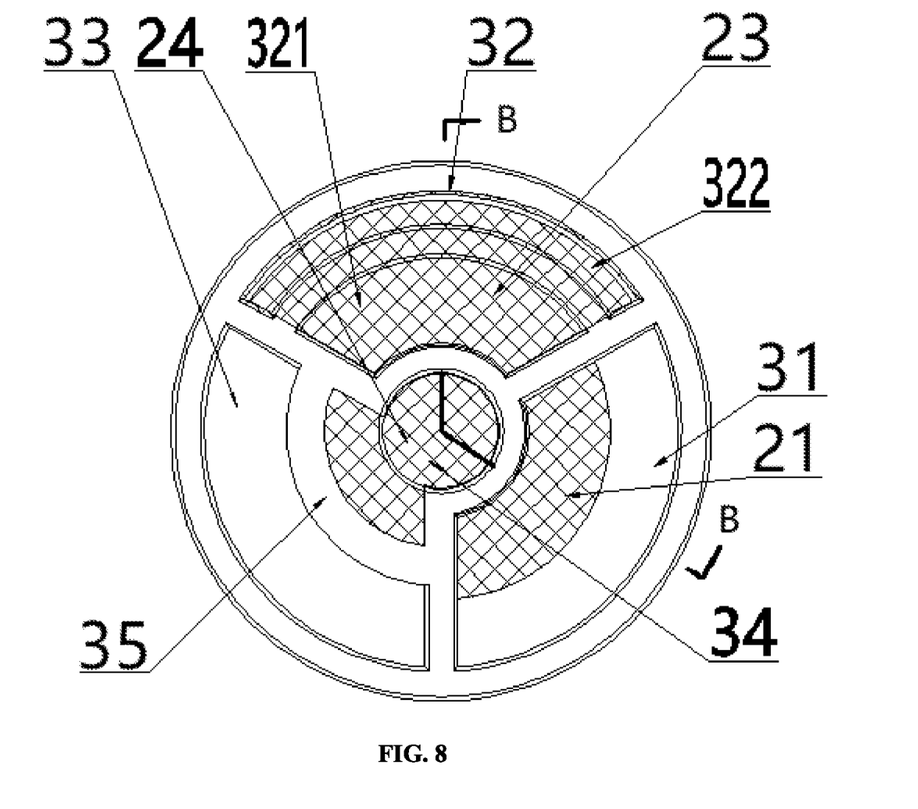
FIG. 8 is a schematic structural diagram of cooperation between a fixed valve plate and a movable valve plate in a running state of the present disclosure.
Figure 9:
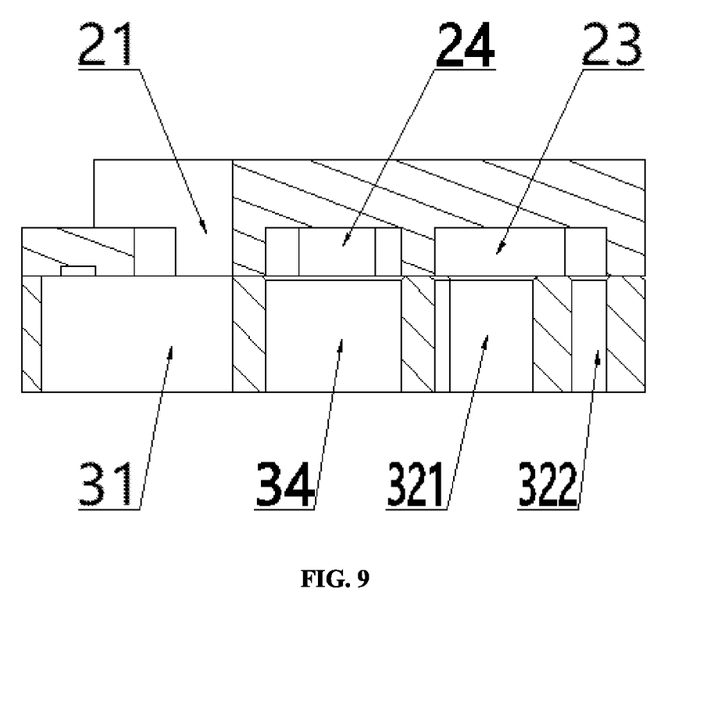
FIG. 9 is a sectional view of B-B in FIG. 8.

The working principle and process are as follows:

A running process of the multifunctional water treatment filter valve includes a normal running mode, a forward flushing mode and a back flushing mode. The driving device drives the movable valve plate 2 to rotate to different positions to switch the filter valve among different running processes. A specific process is as follows:

As shown in FIG. 8 to FIG. 9, in the normal running process, the limber hole 21 is communicated with the first through hole 31. The second groove 23 is communicated with the first water outlet through hole 321 and the second water outlet through hole 322. The third groove 24 and the third through hole 33 are correspondingly blocked. The working process is as follows: Water enters the valve body 1 from the water inlet 11, and enters a tank body at a lower end of the valve body 1 through the limber hole 21 and the first through hole 31 in sequence; and water flow then enters the second groove 23 through the fourth filter element interface 17, the first filter element water outlet interface 152 in the second filter element interface 15, and the first water outlet through hole 321, enters the second water outlet through hole 322 through the second groove 23, and is discharged from the water outlet 12, thus achieving normal running of the filter valve.

Figure 10:
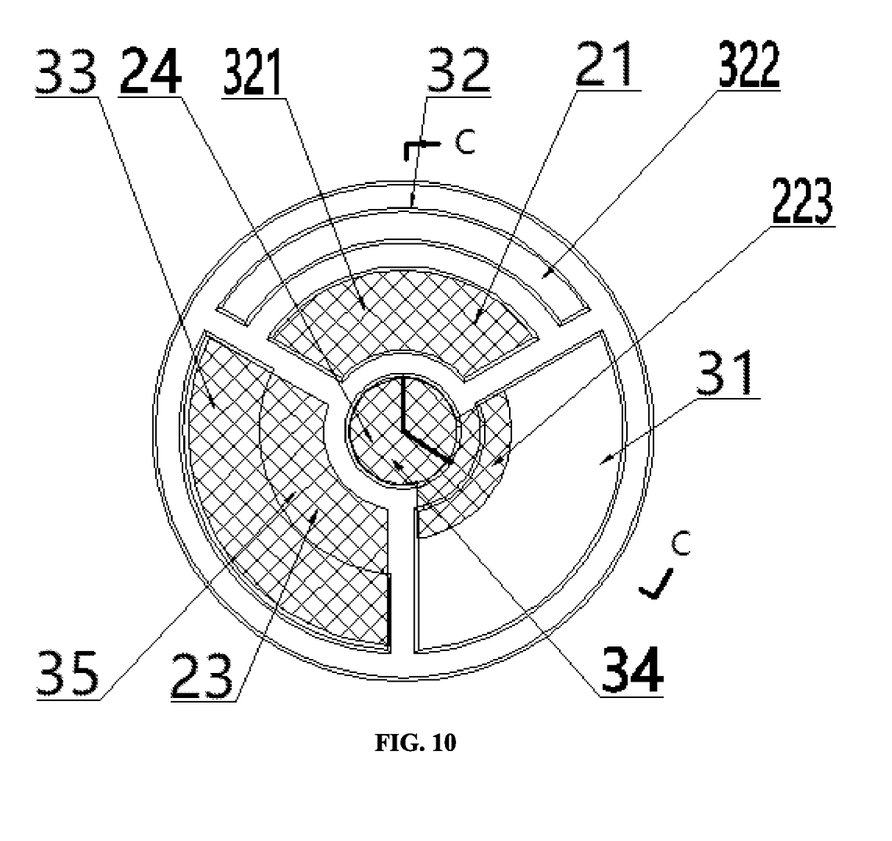
FIG. 10 is a schematic structural diagram of cooperation between a fixed valve plate and a movable valve plate in a back flushing state of the present disclosure.
Figure 11:
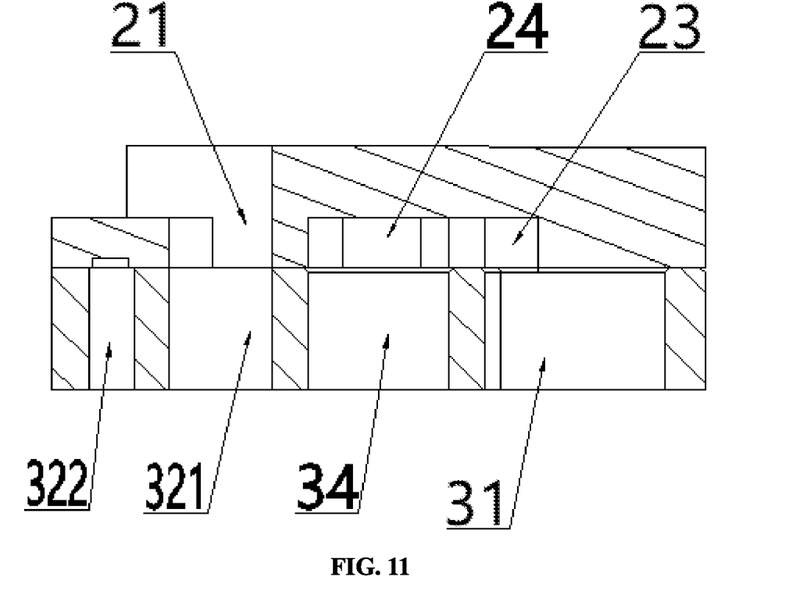
FIG. 11 is a sectional view of C-C in FIG. 10.

As shown in FIG. 10 to FIG. 11, in the back flushing mode, the limber hole 21 is communicated with the first water outlet through hole 321. Water to the second water outlet through hole 322 is cut off. The first through hole 31 is communicated with the third groove 24 through the third blind slot 223. The third groove 24 is communicated with the drainage opening 13. The working process is as follows: Water enters the first water outlet through hole 321 via the limber hole 21. The second water outlet through hole 322 is blocked by the second blind plate 25 on the movable valve plate 2. The water flow enters the tank body at the lower end of the valve body 1 through the first filter element water outlet interface 152 in the second filter element interface 15 and the fourth filter element interface 17. The water flow backflows into a filter element layer via a center filter net of a filter element. The water arrives at the first filter element interface 14 from the filter element layer. Wastewater generated by back flushing arrives at the first through hole 31 through the first filter element interface 14, arrives at the fourth through hole 34 through the third blind slot 223 and the third groove 24, and is discharged from the drainage opening 13. During back flushing, the third through hole 33 is covered by the second groove 23 to cut off the water flow and form a sealed space.

Figure 12:
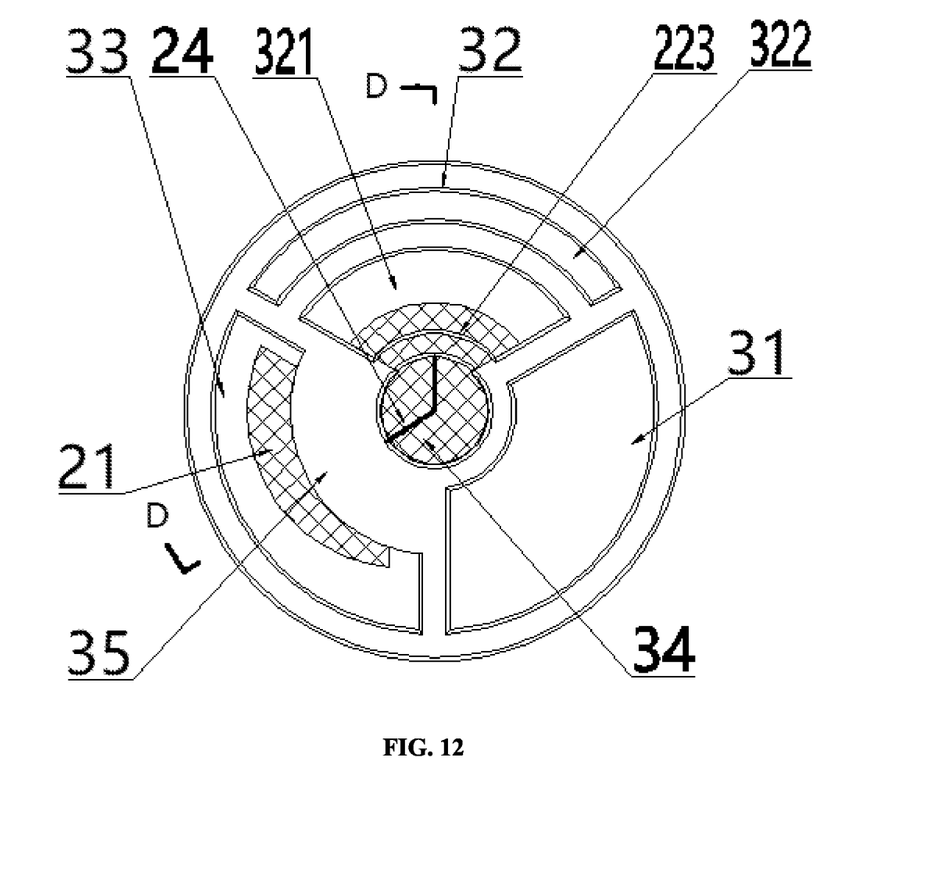
FIG. 12 is a schematic structural diagram of cooperation between a fixed valve plate and a movable valve plate in a forward flushing state of the present disclosure.
Figure 13:
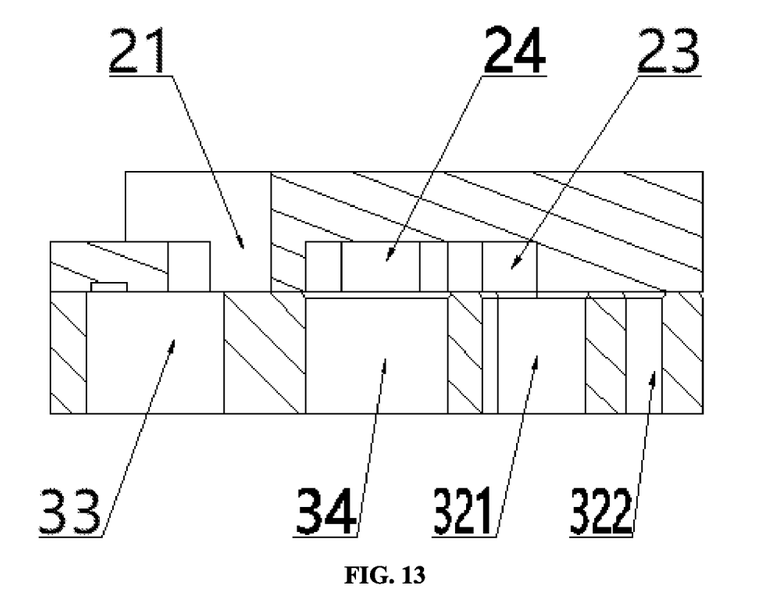
FIG. 13 is a sectional view of D-D in FIG. 12.

As shown in FIG. 12 to FIG. 13, in a forward flushing mode, the limber hole 21 is communicated with the third through hole 33. The first water outlet thorough hole 321 is communicated with the third groove 24 through the third blind slot 223. The third groove 24 is communicated with the drainage opening 13 through the fourth through hole 34. The second water outlet through hole 322 is blocked by the first spacing beam 26 on the movable valve plate 2 to cut off the water. The working process is as follows: The water flow enters the valve body 1 from the water inlet 11, and enters the filter layer of the filter element of the tank body at the lower end of the valve body 1 through the limber hole 21 and the third through hole 33 in sequence. The water arrives at the first filter element water outlet interface 152 in the second filter element interface 15 through the fourth filter element interface 17, enters the third blind slot 223 through the first water outlet through hole 321, and enters the third groove 24 through the third blind slot 223. The water flow is finally discharged from the drainage opening 13 connected to the fourth through hole 34, thus achieving the forward flushing process of the filter valve. During the forward flushing, the first through hole 31 and the second groove 23 are matched to form a closed space, and the second water outlet through hole 322 and the first blind slot 221 are matched to form a closed space to prevent the water from being discharged from the water outlet 12.

Figure 1:
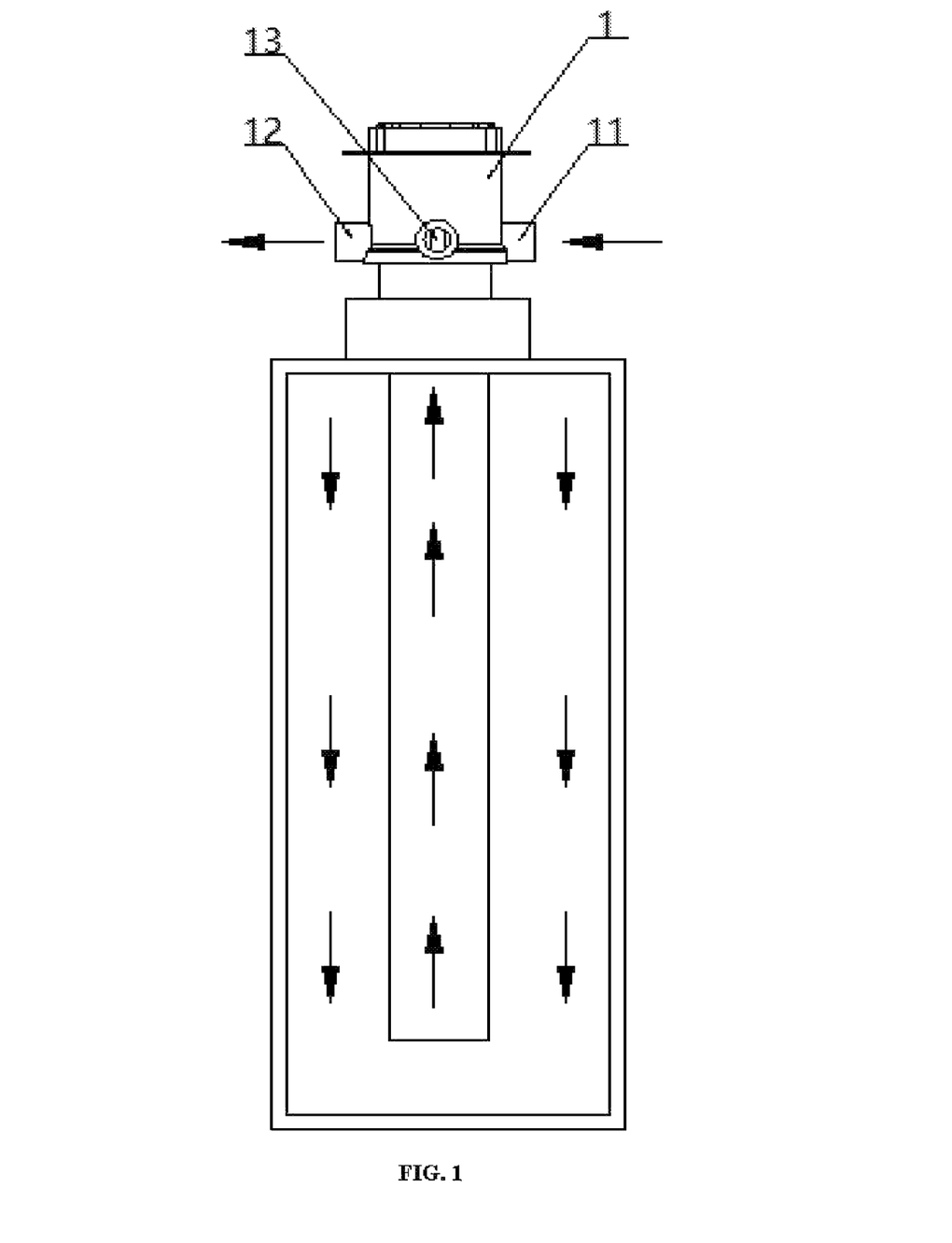
FIG. 1 is an overall schematic running principle diagram of the present disclosure.
Figure 2:
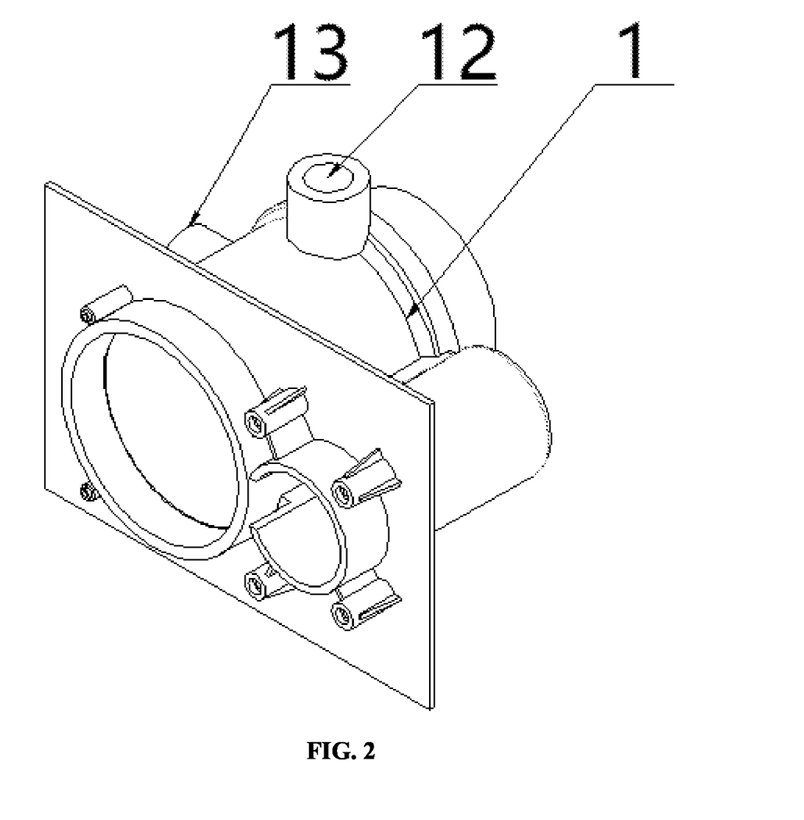
FIG. 2 is a three-dimensional schematic structural diagram of a valve body in the present disclosure.
Figure 3:
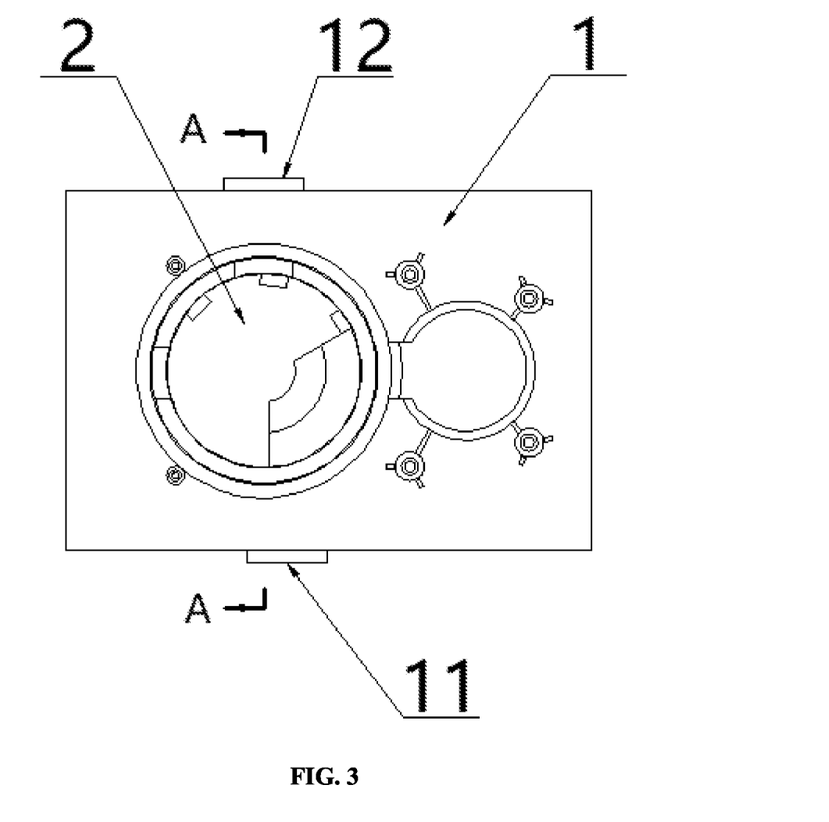
FIG. 3 is a top view of an overall structure of a valve body in the present disclosure.
Figure 4:
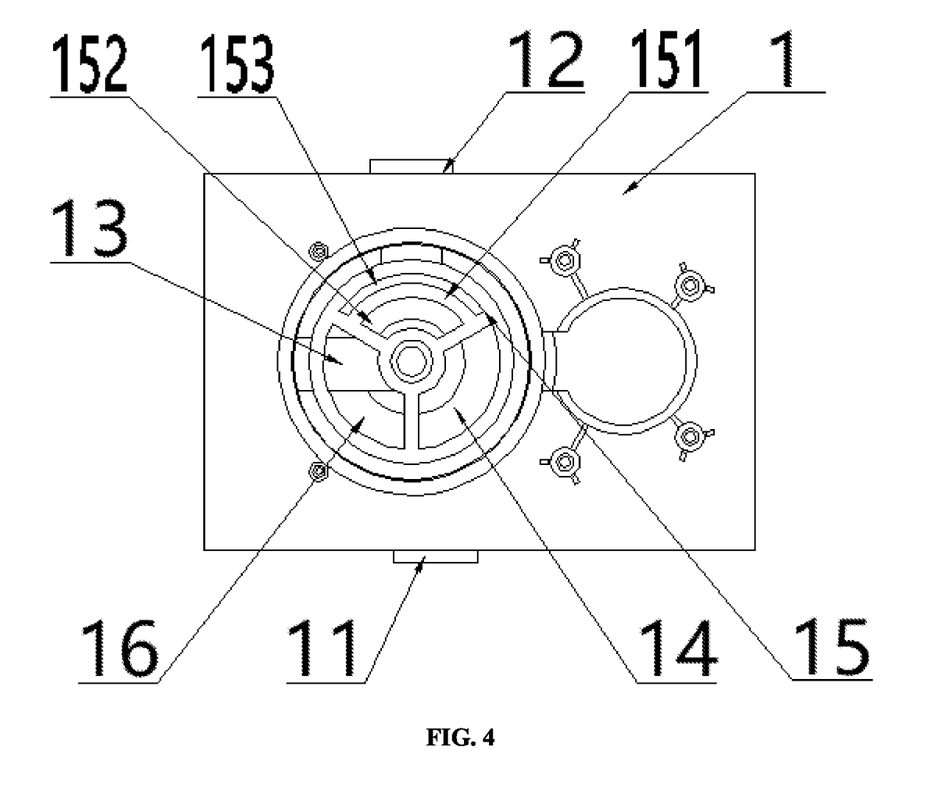
FIG. 4 is a top view of a valve body in the present disclosure without a fixed valve plate and a fixed valve plate.
Figure 5:
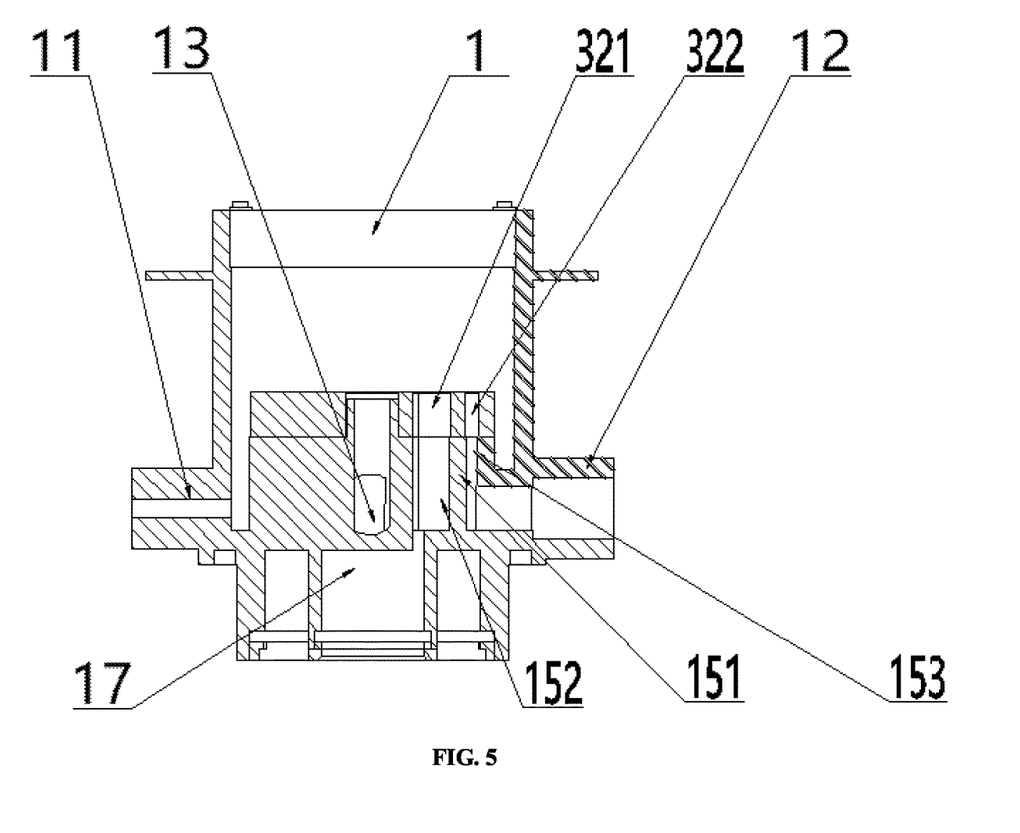
FIG. 5 is a sectional view of A-A in FIG. 3 without a movable valve plate.
Figure 6:
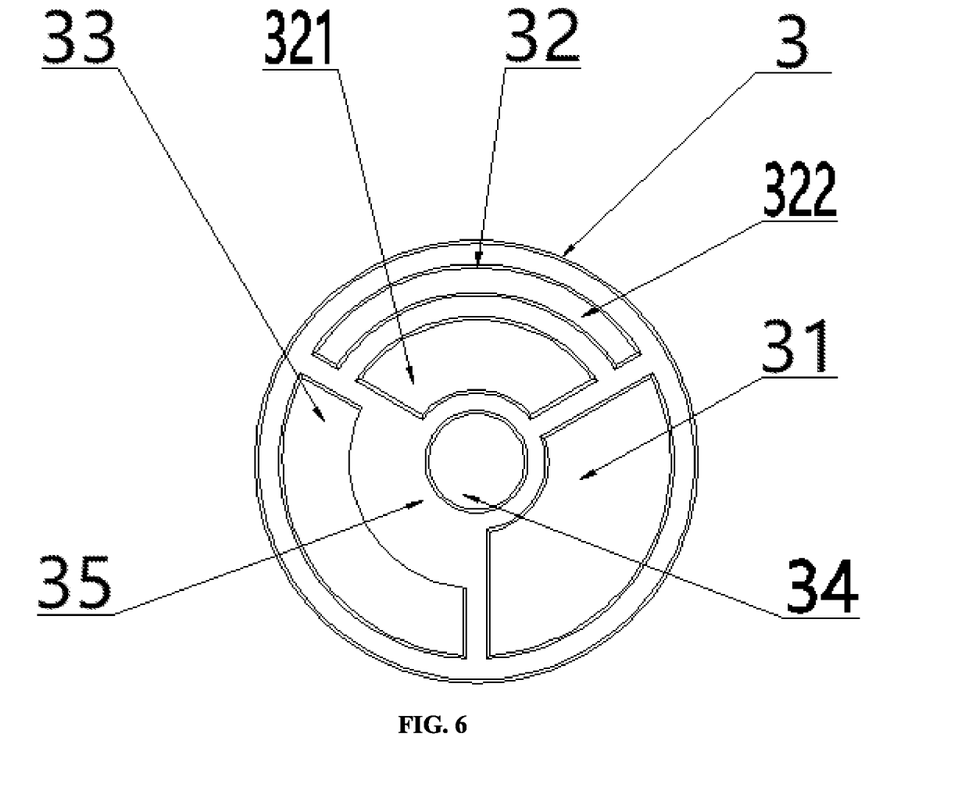
FIG. 6 is a schematic structural diagram of a fixed valve plate in the present disclosure.

In another embodiment of the present disclosure, as shown in FIG. 4 and FIG. 6, the positions of the first filter element interface 14, the second filter element interface 15, and the third filter element interface 16 respectively correspond to the positions of the first through hole 31, the second through hole 32, and the third through hole 33 on a one-to-one basis.

In this way, it is beneficial to better achieve the rotatable fit between the fixed valve plate 3 and the movable valve plate 2, and the functions are achieved more accurately and stably.

In another embodiment of the present disclosure, as shown in FIG. 6, each of the first through hole 31, the second through hole 32 and the third through hole 33 has a central angle of 120 degrees, and each of the limber hole 21, the first groove 22 and the second groove 23 has a central angle of 120 degrees.

In this way, the first through hole 31, the second through hole 32 and the third through hole 33 are arranged in a trisection manner to achieve a water inlet and outlet effective use area of the fixed valve plate 3, and the limber hole, the first groove 22 and the second groove 23 are also arranged in a trisection manner, so that cooperation between the movable valve plate 2 and the fixed valve plate 3 can be better achieved.

In another embodiment of the present disclosure, as shown in FIG. 6, a first blind plate 35 is arranged on an inner side of the third through hole 33 on the fixed valve plate 3; and the first blind plate 35 separates the third through hole 33 from the fourth through hole 34.

In another embodiment of the present disclosure, as shown in FIG. 7, the limber hole 21 is perforated along an axial direction of the movable valve plate 2; the limber hole 21 is of a ring fan-shaped structure; and an outer side of the limber hole 21 along a radial direction of the movable valve plate 2 is provided with a second blind plate 25.

The limber hole 21 is perforated from top to bottom, so that the structure is simpler, and machining and production are easier.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. A multifunctional water treatment filter valve, comprising a valve body, a movable valve plate, a fixed valve plate, and a driving device, wherein the fixed valve plate is fixedly mounted in the valve body; the movable valve plate and the fixed valve plate are in rotatable fit in the valve body; a side wall of the valve body is provided with a water inlet, a water outlet and a drainage opening; the driving device drives the movable valve plate and the fixed valve plate to cooperate with each other to achieve functions of running, back flushing and forward flushing; a first through hole, a second through hole, and a third through hole are formed in the fixed valve plate in sequence along a circumferential direction; the first through hole, the second through hole and the third through hole are all of arc fan-shaped structures and are arranged along the same central axis; a fourth through hole is formed in a center of the fixed valve plate; the second through hole comprises a first water outlet through hole and a second water outlet through hole which are spaced from each other and are both arc fan-shaped; the first water outlet through hole and the second water outlet through hole are arranged along the same central axis; the first water outlet through hole is located at a position, close to the axis, on an inner side of the second water outlet through hole;

the valve body comprises a first filter element interface, a second filter element interface, and a third filter element interface; the first filter element interface, the second filter element interface and the third filter element interface are respectively communicated with the first through hole, the second through hole and the third through hole; the drainage opening is L-shaped, a vertical section of which is arranged in a center position of the valve body and a horizontal section of which extends out of the side wall of the valve body; the fourth through hole sleeves a top of the drainage opening; the second filter element interface comprises a spacing beam, and a first filter element water outlet interface and a second filter element water outlet interface which are spaced by the separation beam; positions of the first filter element water outlet interface and the second filter element water outlet interface respectively correspond to the first water outlet through hole and the second water outlet through hole and are respectively correspondingly communicated; a fourth filter element interface is arranged at a center position of a lower end of the valve body; the fourth filter element interface is communicated with the second filter element interface;

a limber hole communicated with the water inlet, and a first groove and a second groove are formed in the movable valve plate along the circumferential direction; the first groove and the second groove are both arc fan-shaped; a third groove is formed in a center position of the movable valve plate; the first groove comprises a first blind slot, a second blind slot, and a third blind slot which are spaced from each other and are arranged along the same central axis; the first blind slot is arranged on an outer side of the second blind slot; the third blind slot is arranged on an inner side of the second blind slot; a first spacing beam is arranged between the first blind slot and the second blind slot; a second spacing beam is arranged between the second blind slot and the third blind slot; and the third blind slot is communicated with the third groove.

2. The multifunctional water treatment filter valve according to claim 1, wherein the positions of the first filter element interface, the second filter element interface, and the third filter element interface respectively correspond to the positions of the first through hole, the second through hole, and the third through hole on a one-to-one basis.

3. The multifunctional water treatment filter valve according to claim 1, wherein each of the first through hole, the second through hole and the third through hole has a central angle of 120 degrees, and each of the limber hole, the first groove and the second groove has a central angle of 120 degrees.

4. The multifunctional water treatment filter valve according to claim 1, wherein a first blind plate is arranged on an inner side of the third through hole on the fixed valve plate; and the first blind plate separates the third through hole from the fourth through hole.

5. The multifunctional water treatment filter valve according to claim 1, wherein the limber hole is perforated along an axial direction of the movable valve plate; the limber hole is of a ring fan-shaped structure; and an outer side of the limber hole along a radial direction of the movable valve plate is provided with a second blind plate.

* * * * *